Feb. 19, 1952     O. L. SOHIER     2,586,732
FISH SCALING EQUIPMENT
Filed April 23, 1951

INVENTOR.
OTTO L. SOHIER
BY
Gerald P. Welch
ATTORNEY

Patented Feb. 19, 1952

2,586,732

UNITED STATES PATENT OFFICE 2,586,732

FISH-SCALING EQUIPMENT

Otto L. Sohier, Cudahy, Wis.

Application April 23, 1951, Serial No. 222,320

2 Claims. (Cl. 17—8)

This invention relates to improvements in fish scaling equipment, and more particularly to novel fish scaling equipment of the clamping board type.

An object of the invention is to provide a device of the type which will securely retain a fish during the scaling operation by means of securing apparatus of simple and efficient construction.

Another object of the invention is to provide a device of the type having clamping means for the tail of a fish to secure the same during a scaling operation which will permit quick release of the fish when necessary.

Other and further objects of the invention will appear as the description proceeds, reference being had to the accompanying drawing, in which—

Figure 1:
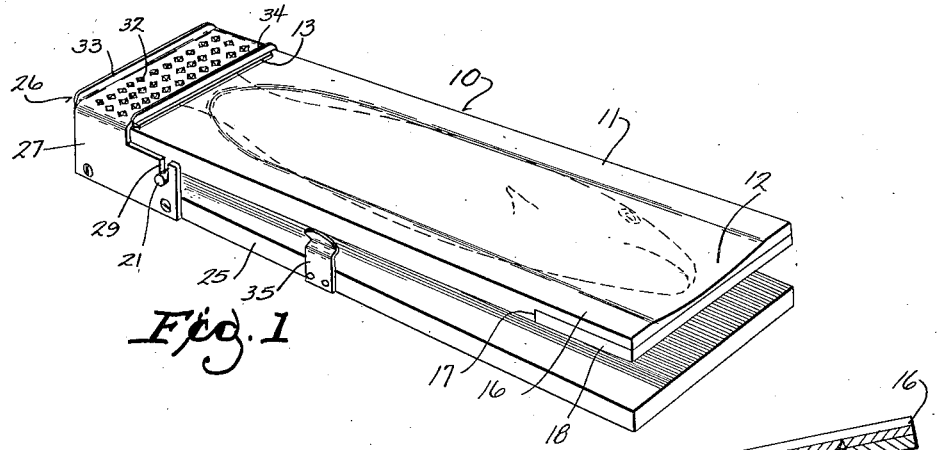
Fig. 1 is a view in perspective of a fish scaling apparatus embodying the invention.
Figure 2:
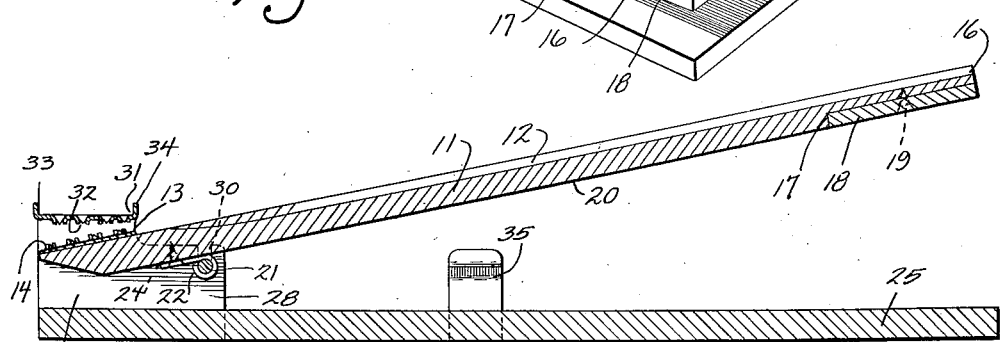
Fig. 2 is an enlarged longitudinal vertical sectional view of the device.
Figure 3:
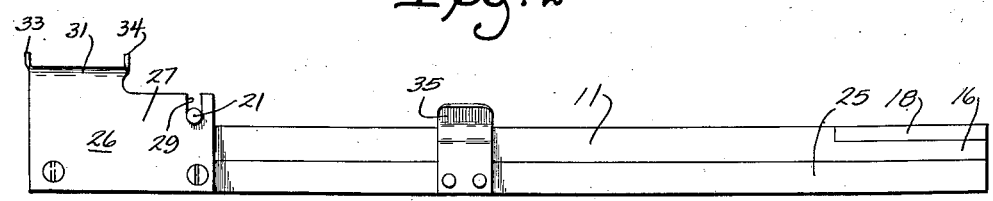
Fig. 3 is a side view in elevation of the device in compacted position for storing or transporting the same.
Figure 4:
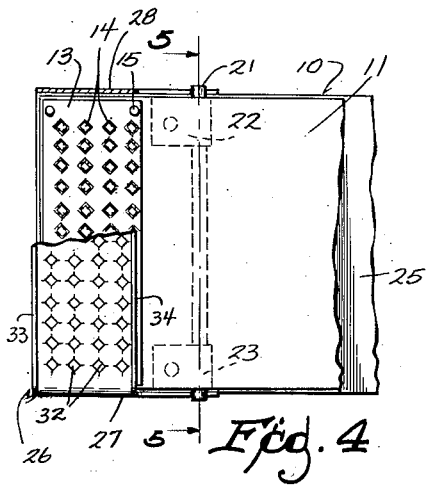
Fig. 4 is an enlarged fragmentary plan view partially cut away of the clamping end of the device.
Figure 5:
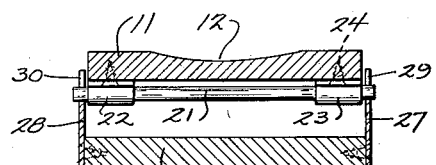
Fig. 5 is a view taken on line 5—5 of Fig. 4.

Referring more particularly to the drawing, the numeral 10 designates the device generally, having a scaling board 11 provided with the arcuate recess 12 in the top surface thereof and a plate 13 at one end thereof, the said plate being punched to provide the upwardly disposed points as at 14 thereof and fixed to said scaling board 11 by the means 15. The outer end 16 of the board 11 is cut away rectangularly as at 17 and a weight, such as a portion of steel bar 18 is affixed therein by means 19. The under side 20 of the board 11 is provided with a transverse pintle 21 fixed thereto by means 22 and 23 in turn fixed to the board 11 by the threaded or other means 24. A base board 25 has an end bracket 26 which is comprised of side portions 27 and 28 having the top transversely aligned notches 29 and 30 and the transverse top connecting portion 31 which is downwardly punched to provide the relatively sharp points as at 32 and has the upwardly disposed reinforcement flanges 33 and 34. The base board 25 has a pair of retaining clips 35 to secure the scaling board 11 when the same is reversed for packing as in transporting the device or for storage thereof.

In use, the board 11 is placed with the recess 12 disposed upwardly and the pintle 21 held in the notches 29 and 30 of the bracket side portions 27 and 28. In this position, the tail of a fish may be secured between the plate 13 and the top bracket portion 31, and the weight 18 will serve to provide leverage for retention of the said fish tail. When one side of the fish has been scaled, the outer end 16 of the board 11 may be lifted thus releasing the tail from the clamping means, and the fish may be turned and replaced on the board 11 and the fish tail may again be clamped for further scaling operations with appropriate conventional tools.

When the device is to be stored or transported, the board 11 is reversed with the recess 12 disposed against the base board 25. In this position the board 11 will be held against the base board 25 by the clips 35.

It will be understood that the device is capable of many modifications in structure and design, without departing from the spirit of the invention, within the scope of the appended claims.

Having thus described the invention, what is claimed and desired to be secured by Letters Patent of the United States is:

1. A fish scaling device including a base board, a bracket member at one end thereof, side portions in said bracket member having upwardly disposed aligned notches spaced from the end of said board, a transverse top portion integral with the side portions of said bracket, the said top portion having plural apertures punched downwardly therethrough to provide sharp retaining points, a scaling board, a transverse pintle spaced from the end thereof, points of said pintle extending laterally from the scaling board adapted to be journalled in said aligned notches, a plate affixed to the end of said scaling board adjacent to the pintle but on the opposite side of said board, plural apertures punched in said plate away from said board surface to provide sharp retaining points, and a weight on the free end of said board to provide leverage for holding the tail of a fish between said plate and said transverse top portion of the bracket.

2. A fish scaling device including a base board, a bracket member at one end thereof, side portions in said bracket member having upwardly disposed aligned notches spaced from the end of said board, a transverse top portion integral with the side portions of said bracket, the said top portion having plural apertures punched downwardly therethrough to provide sharp retaining points, a scaling board having a fish receiving recess in one face thereof, a transverse pintle affixed to the opposite surface thereof and spaced from an end thereof, points of said pintle extending laterally from the scaling board edges adapted to be journalled in said aligned notches, a plate affixed to the end of said scaling board adjacent to the pintle but on the opposite surface of said board, plural apertures punched in said plate away from said board surface to provide sharp retaining points, and a weight on the free end of said board to provide leverage for holding the tail of a fish between said plate and said transverse top portion of the bracket.

OTTO L. SOHIER.

No references cited.